Feb. 11, 1969     R. D. BLACKBURN     3,427,469
TIME DELAY CIRCUIT FOR REGULATOR CONTROL CIRCUIT
Filed Nov. 30, 1965
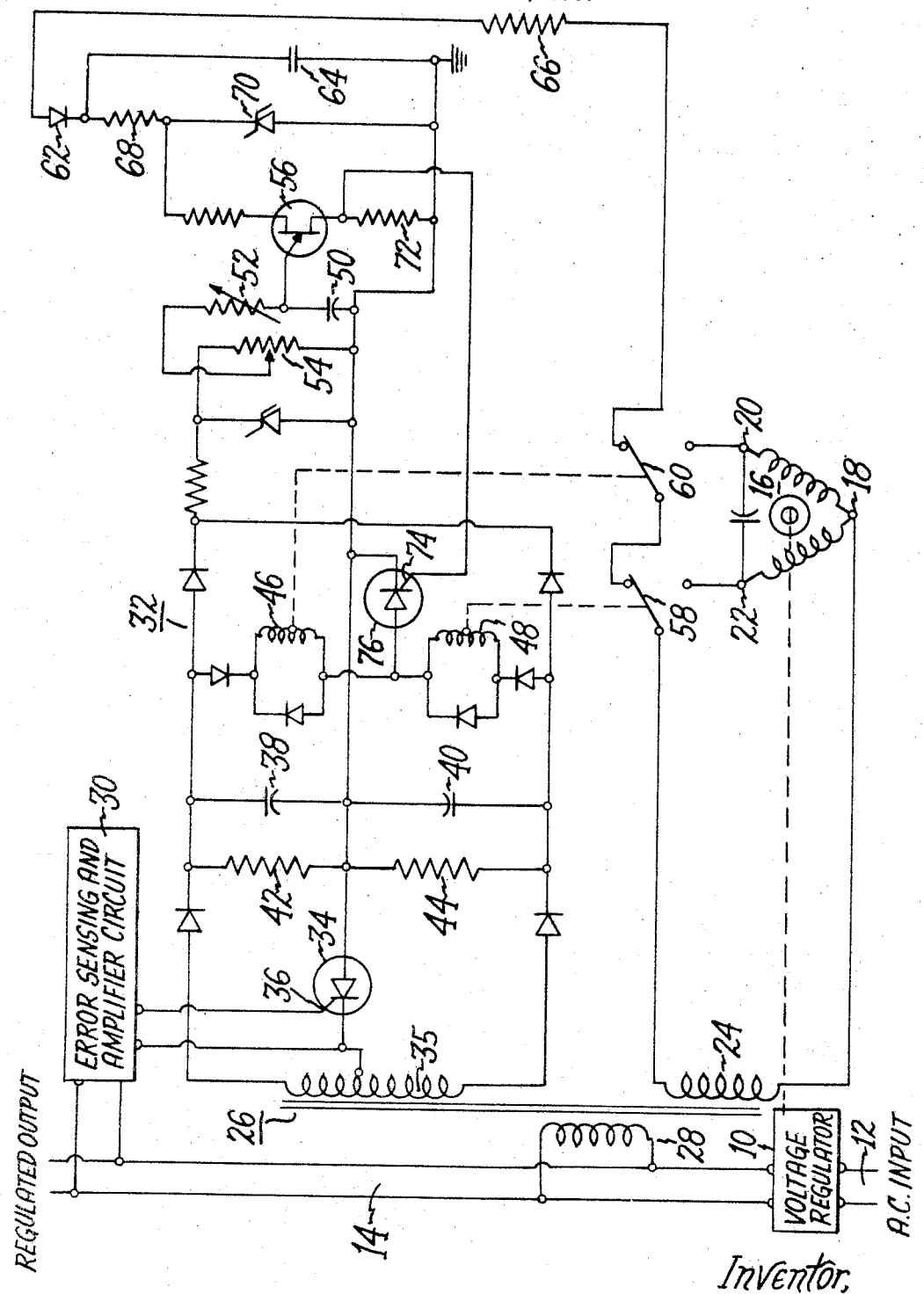
Inventor,
Richard D. Blackburn,
by Francis K. Doyle
His Attorney.

United States Patent Office 3,427,469
Patented Feb. 11, 1969

3,427,469
TIME DELAY CIRCUIT FOR REGULATOR CONTROL CIRCUIT
Richard D. Blackburn, Windsor, Mass., assignor to General Electric Company, a corporation of New York
Filed Nov. 30, 1965, Ser. No. 510,638
U.S. Cl. 307—130                             4 Claims
Int. Cl. H02b 1/24; H01h 83/12; H02h 3/20, 3/24

ABSTRACT OF THE DISCLOSURE

A time delay circuit for a regulator control circuit in which the control circuit includes an error sensing and amplifier circuit connected to energize a switching circuit which includes a pair of motor relays. The time delay circuit comprises a time delay capacitor connected to be charged by the switching circuit and a unijunction transistor connected to discharge the time delay capacitor. The unijunction transistor is provided with a reference voltage through a pair of normally closed relay contacts connected in series and a Zener diode, the connection being such that when either relay moves from a normally closed position to a motor operating position the reference voltage of the unijunction transistor becomes zero.

---

This invention relates to regulator control circuits and more particularly to a time delay circuit for a regulator control circuit.

In the regulator art it is desirable to provide a time delay to control circuits to prevent the regulator control circuit from actuating the regulator whenever the regulated voltage is subjected to intermittent or momentary deviations. In many instances, such as switching surges and the like, such momentary deviations are self-correcting. As will be understood, correcting of such deviations by actuation of the regulator will often require the regulator to again be activated after dissipation of the switching surge to return the regulated voltage to the desired normal voltage. A time delay circuit may be used to prevent actuation of the regulator during intermittent, momentary deviations, thus preventing excessive operation of the regulator.

Therefore, it is an object of this invention to provide a time delay circuit for use in voltage regulator control circuits to prevent the immediate operation of such control circuits in response to deviations in the regulated voltage.

Briefly, in one form this invention comprises a time delay circuit utilizing a unijunction transistor connected to discharge a time delay capacitor. The reference voltage for the unijunction transistor is provided from the regulator motor operating voltage such that when the regulator motor is operating the reference voltage of the unijunction transistor becomes zero.

The invention which it is desired to protect will be clearly pointed out and distinctly claimed in the claims appended hereto. However, it is believed that this invention and the manner in which its objects and advantages are obtained, as well as other objects and advantages thereof will be better understood from consideration of the following detailed description, especially when considered in the light of the accompanying drawing, in which the single figure illustrates diagrammatically a preferred embodiment of the invention.

Referring to the drawing, there is shown a voltage regulator device 10 connected between an unregulated supply circuit 12 and a regulated output 14. Regulator 10 may be any type of reversible regulator, such as a transformer regulator of the induction variety, a sliding brush variety or a tap changing variety. For purposes of illustration, regulator 10 is shown as being driven by a reversible servomotor 16. As will be understood motor 16 may be of any desired type, the presently preferred type being shown as an induction motor of the capacitor split phase type having a common terminal 18. The forward and reverse rotations of motor 16 are determined by the energization of the terminals 20 or 22. A source of current for motor 16 is shown as provided by secondary winding 24 on supply transformer 26. As shown, supply transformer 26 preferably has primary winding 28 connected across the regulated output 14.

The regulator control circuit may generally be considered as consisting of an error sensing and amplifier circuit 30 and a switching and time delay circuit 32. The error sensing and amplifier circuit may be of any desired type, such as those which are disclosed in application Ser. No. 184,711 filed Apr. 3, 1962 for Solid State Switching Device Control Circuit in the name of T. P. Sylvan now abandoned in favor of continuation-in-part application Ser. No. 327,034, filed Nov. 29, 1963, now Patent No. 3,297,938, or application Ser. No. 285,440 filed June 4, 1963, for Control Circuit in the name of C. J. Kettler, now Patent No. 3,275,928, both applications being assigned to the same assignee as this invention. The switching circuit may also be of any desired type. However, for purposes of this description a switching circuit, such as is disclosed in application Ser. No. 510,503 filed Nov. 30, 1965 for Static Control Circuit for Regulators in the name of C. J. Kettler, now Patent No. 3,365,656, and assigned to the same assignee as this invention, will be illustrated and described.

Referring again to the drawing, a switching circuit is shown comprising a silicon control rectifier 34 which is energized through the center tapped secondary 35 of transformer 26. The gate 36 of rectifier 34 is energized by an error signal from the error sensing and amplifier circuit 30 causing the silicon control rectifier 34 to fire. This permits a charge to be built up on either of capacitors 38 or 40, depending on the direction of the error sensed in the regulated voltage 14. When the error signal is removed from gate 36 the charge on either capacitor 38 or 40 will be readily dissipated through resistors 42 or 44. To prevent the firing of the silicon control rectifier 34 from immediately operating either of the motor control relays 46 or 48 of motor 16, a time delay circuit is provided.

The time delay circuit comprises a time delay capacitor 50 which begins to accumulate a charge through variable resistor 52 and potentiometer 54, as soon as a voltage appears across either capacitor 38 or 40. A unijunction transistor 56 is connected to time delay capacitor 50 to discharge the capacitor at the end of the time delay. The time delay is set by variable resistor 52 which controls the rate of charge of capacitor 50 and thus the time at which the unijunction transistor 56 will fire.

As can be seen from the drawing, the voltage used for driving motor 16 is also used as a reference voltage for the unijunction transistor 56. This voltage is supplied through the normally closed position of relay contacts 58 and 60. The voltage is changed from A-C to D-C by rectifier 62 and capacitor 64. A resistor 66 is provided to limit the in-rush current to the circuit when capacitor 64 is charging after having been discharged. The rectified voltage is applied to resistor 68 and Zener diode 70 providing a substantial ripple-free voltage. This voltage is used as the reference voltage for unijunction transistor 56. As will be understood, resistor 54 is provided to compensate for variations in the stand-off ratio of the unijunction transistor.

From the above it will be apparent that when the charge on capacitor 50 reaches a predetermined value, the time delay ends and unijunction transistor 56 spills over. A major part of the charge on capacitor 50 appears as a current through resistor 72. The resulting voltage drop is applied to gate 74 of silicon control rectifier 76 causing rectifier 76 to conduct. The conducting of rectifier 76 energizes either relay 46 or relay 48, depending upon which capacitor, either 38 or 40, was charged at the time. As relay 46 or relay 48 is energized either contact 58 or 60 will be operated to actuate motor 16 to move regulator 10 in the desired direction. However, when either contact 58 or 60 is operated, the contact to unijunction transistor 56 becomes open. With the opening of contact 58 or 60 no voltage will be applied to the unijunction transistor 56. Capacitor 64 will rapidly discharge and the reference voltage for unijunction transistor 56 will go to zero. This assures that transistor 56 will remain spilled over and allow the complete discharge of time delay capacitor 50. Further, the removal of the reference voltage of the unijunction transistor 56 will also assure that the time delay capacitor 50 remains discharged throughout the operation of the regulator.

When the regulator voltage has returned to the desired voltage, the relay, either 46 or 48, will become de-energized and contact 58 or 60 will return to the normally closed position shown. This will reapply the reference voltage to transistor 56 with time delay capacitor 50 completely discharged. The time delay circuit and switching circuit are then ready for the next operating cycle.

It should also be noted that the interlocking of relay contacts 58 and 60 assures that simultaneous excitation of both sides of the motor will not occur. As will be apparent from the figure, when relay 56 is moved from the closed position shown to the position to energize terminal 22, operation of contact 60 will be ineffective to energize terminal 20. In the same manner, if contact 60 is moved to a position to energize terminal 20 movement of contact 58 to energize contact 22 will remove the voltage from contact 60, thereby preventing the simultaneous energization of terminals 20 and 22. Thus it can be seen that by means of the series connected contacts 58 and 60 it will be impossible to energize simultaneously both sides of motor 16.

An integrating function is provided by the time delay circuit of this invention. This function provides for the slow discharge of time delay capacitor 50 if the error signal is removed prior to the actuation of either motor contact 58 or 60. As can be seen, if the error signal is removed before actuation of contacts 58 or 60, capacitor 50 will slowly discharge through resistors 52, 54. The time for discharge is substantially the same as the time for charging. If an error signal should appear during the discharge of capacitor 50, the capacitor will begin to charge from the then present charged level of capacitor 50. This assures that the second error signal will not require the full time delay prior to firing of unijunction transistor 56. Of course, it will be apparent that capacitors 38 or 40 will be rapidly discharged through either resistor 42 or 44 as soon as the error signal is removed.

While there has been shown and described the present preferred embodiment of this invention it will of course be obvious to those skilled in the art that various changes may be made in the circuit details without departing from the spirit and scope of the invention, particularly as it is defined in the appended claims.

What is claimed as new and which it is desired to secure by Letters Patent of the United States is:

1. A time delay circuit for a regulator control circuit in which the control circuit includes an error sensing and amplifier circuit connected to a switching circuit to energize said switching circuit on receipt of an error signal, said switching circuit including a pair of motor relays connected to be energzed in accordance with the direction of the error signal, said time delay circuit comprising a time delay capacitor and a unijunction transistor connected in circuit therewith to discharge said time delay capacitor, said time delay capacitor connected to said switching circuit to accumulate a charge when said switching circuit is energized and means for applying a reference voltage to said unijunction transistor, said means including a pair of normally closed motor relay contacts connected in series, said reference voltage dropping to zero whenever either of said motor relay contacts is moved from said normally closed position.

2. A time delay circuit as claimed in claim 1 in which a Zener diode is provided in circuit with said normally closed motor relays to provide a substantially ripple-free reference voltage to said unijunction transistor.

3. A time delay circuit as claimed in claim 1 in which said time delay capacitor is provided with charging means to charge said capacitor and with discharge means to discharge said capacitor through substantially the same time as in charging when said time delay capacitor is not discharged through said unijunction transistor.

4. A time delay circuit for a regulator control circuit in which the control circuit includes an error sensing and amplifier circuit connected to a switching circuit to energize said switching circuit on receipt of an error signal, said switching circuit including a pair of motor relays connected to be energzed in accordance with the direction of the error signal, said time delay circuit comprising a time delay capacitor, means connecting said time delay capacitor to said switching circuit to charge said time delay capacitor when an error signal energizes said switching circuit, a unijunction transistor connected in circuit to discharge said time delay capacitor, said unijunction transistor firing to discharge said capacitor when said capacitor reaches a predetermined charge, means for applying a reference voltage to said unijunction transistor, said means including a pair of normally closed motor relay contacts connected in series, said reference voltage dropping to zero whenever either of said motor relay contacts is moved from said normally closed position, and means to discharge said time delay capacitor through substantially the same time as the charging of said time delay capacitor if said error signal is removed before said unijunction transistor fires.

References Cited

UNITED STATES PATENTS

| 3,045,150 | 7/1962 | Mann | 317—148.5 |
| 3,182,227 | 5/1965 | Brittain et al. | 317—142 |
| 3,237,091 | 2/1966 | Attewell | 323—43.5 |
| 3,277,320 | 10/1966 | Conner | 307—141 |
| 3,297,938 | 1/1967 | Sylvan | 323—43.5 |
| 3,303,396 | 2/1967 | Culbertson | 317—142 |

ROBERT K. SCHAEFER, *Primary Examiner.*

T. B. JOIKE, *Assistant Examiner.*

U.S. Cl. X.R.

323—43.5; 317—142